United States Patent

Udagawa et al.

[11] 4,034,626
[45] July 12, 1977

[54] CONTROL SYSTEM FOR LIMITING ENGINE SPEED DOWN ON AUTOMATIC TRANSMISSION SHIFTING AT LOW ENGINE TEMPERATURE

[75] Inventors: Masanori Udagawa, Musashino; Toru Suyama, Tokorozawa, both of Japan

[73] Assignee: Nissan Motor Co., Ltd., Japan

[21] Appl. No.: 578,423

[22] Filed: May 19, 1975

[30] Foreign Application Priority Data

May 23, 1974 Japan .................. 49-58085[U]

[51] Int. Cl.² .................. B60K 41/18; F01N 3/00
[52] U.S. Cl. .................. 74/857; 60/284; 74/874
[58] Field of Search .......... 74/856, 857, 859, 860, 74/872, 874; 60/284

[56] References Cited

U.S. PATENT DOCUMENTS

| | | | |
|---|---|---|---|
| 3,756,208 | 9/1973 | Toda et al. .................. | 74/872 X |
| 3,868,868 | 3/1975 | Chana .................. | 74/859 X |
| 3,918,257 | 11/1975 | Hirose et al. .................. | 74/860 X |
| 3,927,523 | 12/1975 | Shioyama et al. .................. | 60/284 X |

Primary Examiner—Allan D. Herrmann
Assistant Examiner—Lance W. Chandler
Attorney, Agent, or Firm—Robert E. Burns; Emmanuel J. Lobato; Bruce L. Adams

[57] ABSTRACT

With respect to an automatic transmission in a motor vehicle, which transmission has a vehicle speed-sensitive governor valve and a throttle valve responsive to the intake manifold vacuum, the control system comprises a solenoid-operated selector valve which causes the vacuum chamber of the throttle valve to communicate with either the intake manifold or the atmosphere and a temperature-sensitive switch which is attached to the engine for energizing the selector valve, so that the vacuum chamber is allowed to communicate exclusively with the atmosphere when the engine temperature is not high enough to allow after-burning of the exhaust gas in a thermal reactor attached to the engine, resulting in occurrence of a shifting at a higher engine speed.

3 Claims, 3 Drawing Figures

CONTROL SYSTEM FOR LIMITING ENGINE SPEED DOWN ON AUTOMATIC TRANSMISSION SHIFTING AT LOW ENGINE TEMPERATURE

This invention relates generally to an automatic transmission for motor vehicles, the shifter valve of which is governed by a vehicle speed-sensitive governor valve and the throttle valve responsive to the intake manifold vacuum, and more particularly to a control system for transferring a shift point in the transmission to a point at a higher engine speed when the engine is not sufficiently heated.

In the technological field of preventing air pollution attributable to exhaust gases from automotive engines, a general method which comprises forcing the engine exhaust gas to react with air or oxygen within a reaction chamber attached to the exhaust line of the engine occupies an important position at present. The reaction chamber for the practical application of this method is generally called afterburner or thermal reactor.

Since the reactions occurring in a thermal reactor are burning reactions, it is an essential requisite for allowing the thermal reactor to function at expected efficiencies that the temperature in the reactor is maintained above a certain critical temperature. In this connection, it is known that the temperature in a thermal reactor is roughly proportional to the engine temperature. It is therefore necessary to leave the engine indling for a comparatively long period of time in order to accomplish a fair warm-up of the engine before starting a motor vehicle equipped with a thermal reactor. In practice, however, drivers are liable to start the vehicle without awaiting the completion of the engine warm-up. Frequently they start the vehicle soon after the ignition of the engine and realize the so-called "cold-start" mode. Then the exhaust gas cannot be burned completely in the thermal reactor due to low temperature thereof, so that the concentrations of harmful substances in the exhaust gas at the instant of emission into the atmosphere exceed permissible levels if the vehicle is accelerated soon after the cold-start and the engine is run at low speeds and under heavy loads. Such an unfavorable situation is most liable to be brought about when the engine speed slows down abruptly by shifting of the transmission from the first gear range to the second gear range. In regard to the transmission, automatic transmissions are predominant in current motor vehicles, particularly in automobiles.

The present invention is concerned with a motor vehicle having both a thermal reactor and an automatic transmission, the latter of which is of a type comprising a vehicle speed-sensive governor valve and a throttle valve responsive to the intake manifold vacuum, and has an object of providing a motor vehicle equipped with a control system for causing a shifting of the atuomatic transmission to occur at a higher engine speed when the temperature of the engine is below a predetermined temperature compared with an engine speed at which the shifting occurs normally or at engine temperatures above the predetermined temperature, so that the temperature in the thermal reactor can be raised quickly.

More practically, it is an object of the invention to provide a motor vehicle having a thermal reactor and an automatic transmission of the above described type, which motor vehicle is equipped with a control system for breaking fluid communication between a diaphragm chamber for governing a throttle valve element and the intake manifold and causing the diaphragm chamber to communicate exclusively with the atmosphere when the engine temperature is below a predetermined temperature.

According to the invention, there is provided a motor vehicle comprising, in combination with the engine and a pipe which connects the diaphragm chamber of the throttle valve to the intake manifold, a control system consisting of a selector valve having a port communicating with the atmosphere and being mounted on the pipe such that the diaphragm chamber normally communicates exclusively with the intake manifold, a temperature-sensitive switch attached to the engine and means to operate the selector valve at a position of the switch such that the diaphragm chamber is caused to communicate exclusively with the atmosphere through the port, wherein the switch is held at the aforementioned position when the temperature of the engine is below a predetermined temperature.

The improvement according to the invention has the advantage that a shifting in a conventional automatic transmission is caused to occur at a higher engine speed when the engine temperature is below a desired level, resulting in rise of the exhaust gas temperature and prevention of a malfunction of the thermal reactor even when the vehicle is run before completion of a sufficient warm-up of the engine.

The invention will be fully understood from the following detailed description of a preferred embodiment thereof with reference to the accompanying drawings, in which.

Figure 1:
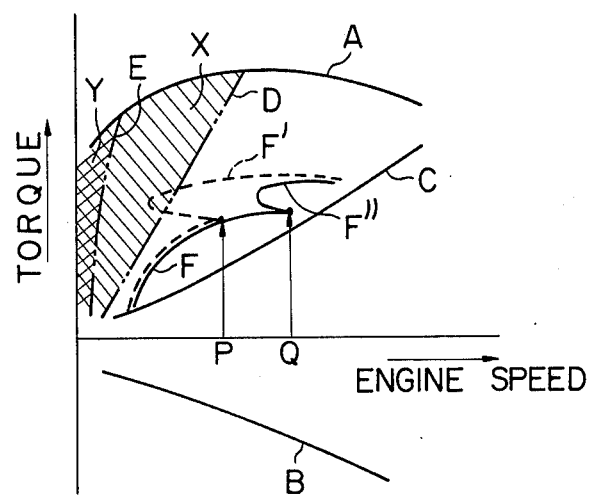
FIG. 1 is a graph showing qualitatively torque characteristic curves of an internal combustion engine on a motor vehicle with respect to the engine speed together with relationships between the function of a thermal reactor attached to the engine and the engine speed.

In FIG. 1, curves A, B and C are the familiar torque characteristic curves for an internal combustion engine on a motor vehicle at full throttle, at zero throttle opening and during cruising of the vehicle, respectively. The line D is a boundary line for a normal function of a thermal reactor attached to the engine to burn the exhaust gas, and the hatched area X represents a region in which the burning of the exhaust gas in the thermal reactor does not occur or occurs only incompletely if the engine has not been subjected preliminarily to a sufficient warm-up. The line E is a similar boundary line for a case when the engine has been sufficiently warmed up, and the left side area Y represents a region in which the burning of the exhaust gas in the thermal reactor either fails to occur or occurs only incompletely.

For a while after the vehicle is started, both the engine speed and the engine torque increase along the curve F. At the point P, shifting from the first gear to the second gear occurs. The engine torque continues to increase thereafter, but the engine speed slows down for a certain period of time as shown by the curve F'. As a result, the curve F' intersects the line D and intrudes into the area X. If, therefore, the starting of the vehicle is carried out without or after an insufficient idling of the engine for warm-up, the thermal reactor discharges and exhaust gas containing therein significant amounts of pollutants such as unburned hydrocarbons and carbon monoxide while the torque curve F' remains in the area X. When the engine is sufficiently heated prior to the vehicle starting, there occurs no problem with respect to the discharged exhaust gas since the line E lies clearly separate from the curve F'.

The present invention aims at transferring the shift point P to another point Q which lies at a distance from the point P on the right side or on the higher engine speed side when the engine temperature is not sufficiently elevated. Such a transfer of the shift point P to the point Q prevents the inflection of the curve F at the point P, so that the engine speed continues to increase beyond the point P. At the point Q, the curve F inflects and thereafter gives a trajectory represented by the curve F''. The curve F'' starts toward the left, but turns to the right at an ample distance from the line D. Accordingly, the burning reactions in the thermal reactor can proceed normally even when a gear shift occurs shortly after the cold start.

Figure 2:
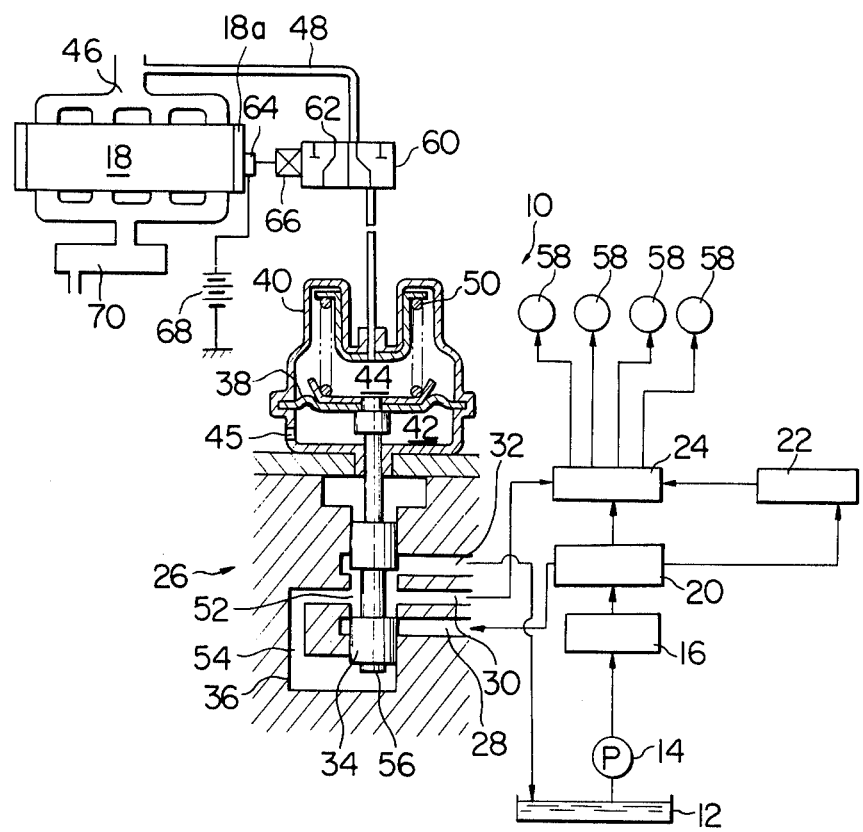
FIG. 2 is a diagram showing a combination of an automatic transmission and an engine in a motor vehicle, which combination is provided with a control system according to the invention.

A preferred embodiment of the invention is shown in FIG. 2. The reference numeral 10 indicates generally an essential part of a fluid pressure system of an automatic transmission for a motor vehicle (not shown). The fluid pressure system 10 has an oil reservoir 12, an oil pump 14 and a regulator valve 16 in a well known combination. The oil pump 14 is driven by an internal combustion engine 18 for driving the vehicle and provides a regulated fluid pressure to a selector valve 20 which is connected to a manually operated selector level (not shown). The selector valve 20 provides a line pressure, the magnitude of which depends on the position of the selector valve 20, to a governor valve 22, a shifter valve 24 and a throttle valve 26. The governor valve 22 modulates the line pressure to a governor pressure in response to the vehicle speed and supplied the governor pressure to the shifter valve 24. The above described fluid circuit 10 and the respective elements thereof are old and well known in the art of automobiles and will need no further explanation.

The throttle valve 26 has three ports, namely, a line pressure port 28, an output or throttle pressure port 30 and a drain or return port 32. A differential plunger 34, which is commonly called a spool, is slidably received in a valve housing 36 for regulating the openings of these three ports 28, 30 and 32. An end (upper in FIG. 2) of the spool 34 is fixed to a flexible diaphragm 38 which is supported in a diaphragm housing 40. The diagram 38 divides the interior of the diaphragm housing 40 into two chambers 42 and 44. The lower chamber 42 communicates with the atmosphere through a hole 45 in the wall of the housing 40, and the upper chamber 44 communicates with an intake manifold 46 of the engine 18 via pipe 48 to apply the vacuum developed in the intake manifold 46 to the diaphragm 38. A compression spring 50 is disposed in the upper or vacuum chamber 44 so as to offer resistance against an upward movement of the diaphragm 38 caused by the applied vacuum. A bore 52 in the valve housing 36, in which the spool 34 is received, is provided with a passageway 54 which provides a free communication between the output port 30 and the other (lower in FIG. 2) end 56 of the spool 34.

The thus constructed throttle valve 26 is quite familiar in the conventional automatic transmission 10. In the throttle valve 26, the line pressure applied to the input port 28 is modulated to a less magnitude of throttle pressure which varies depending on the magnitude of the vacuum exerted on the diaphragm 38. The position of the spool 34 is balanced against the force of the compression spring 50 by a force produced by the action of the throttle pressure on the end face 56. The shifter valve 24 receives the thus modulated throttle pressure from the output port 30 as well as the governor pressure from the governor valve 22 which is sensitive to the vehicle speed. The output of the shifter valve 24 causes a plurality of friction units 58 to stay individually either engaged or disengaged depending on the respective magnitudes of the governor pressure and the throttle pressure. A combination of the modes of the respective friction units 58 causes either an upshift or a downshift in accordance with operating conditions of the engine 18 and the position of the manual selector valve 20.

According to the invention, the pipe 48, which connects the vacuum chamber 44 of the throttle valve 26 to the intake manifold 46, is equipped with a solenoid-operated three-way selector valve 60. This selector valve 60 is normally kept at a position to allow the vacuum chamber 44 to communicate with the intake manifold 46, but has a third port 62 exposed to the atmosphere. A temperature-sensitive switch 64 is attached to the engine 18 at a position suitable for detecting or estimating the engine temperature. As a preferred example, the switch 64 is attached to a cooling water jacket 18a of the engine 18. The switch 64 is adjusted so as to provide an energizing current to a solenoid 66, which is assembled with the selector valve 60, when the temperature of the cooling water falls below a predetermined temperature. The reference numeral 68 indicates a D.C. source on the vehicle for supplying the current to the solenoid 66.

In operation, the control system according to the invention i.e., the combination of the temperature-sensitive switch 64, the solenoid 66 and the selector valve 60, has no influence on the function of the throttle valve 26 when the cooling water temperature is above the predetermined temperature and hence the diaphragm 38 is under the influence of the vacuum in the intake manifold 46.

Figure 3:
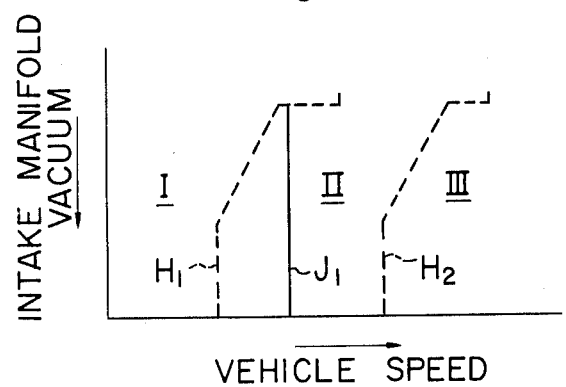
FIG. 3 is a graph showing qualitatively shift patterns of the automatic transmission in the combination of FIG. 2.

FIG. 3 is an explanatory graph showing shifting patterns with respect to a motor vehicle equipped with the fluid lines and the respective elements of FIG. 2. The three areas indicated by reference numerals I, II and III represent the first gear range, second gear range and third gear range, respectively, for the automatic transmission 10. When the selector valve 60 remains at the normal position, the I-to-II shifting occurs along the broken line $H_1$ in FIG. 3 and the II-to-III along the broken line $H_2$. The vehicle speed at which an upshift occurs generally lowers as the vacuum multiplies. When, however, the temperature of the cooling water is below the predetermined temperature due to an insufficient warm-up of the engine 18, the switch 64 functions to energize the solenoid 66 and cause the selector valve 60 to change its position from the normal position to the another. At the latter position of the selector valve 60, the communication between the vacuum chamber 44 of the throttle valve 26 and the intake manifold 46 is broken, and the vacuum chamber 44 is caused to communicate exclusively with the atmosphere through the port 62 of the selector valve 60. Accordingly, the diaphragm 38 is pushed down in FIG. 2 by the compression spring 50, causing the spool 34 to move downward in FIG. 2. As a result, the return port 32 is closed, and the line pressure supplied to the input port 28 leaves the throttle valve 26 from the output port 30 without modulation. This means a noticeable rise in the magnitude of the throttle pressure applied to the shifter valve 24. Therefore, the shift point P in FIG. 1 moves to the point Q on the higher engine speed side, and the boundary line $H_1$ in FIG. 3 is replaced by the solid line $J_1$.

Thus, the engine 18 is saved from being operated under such a low-speed and heavy-load condition as represented by the left side part of the curve F' in FIG. 1, and the temperature of the exhaust gas is maintained on sufficiently high levels. Consequently, a thermal reactor 70 attached to the engine 18 can be heated quickly, and burning reactions of the exhaust gas in the thermal reactor 70 proceed at satisfactory efficiencies even if the vehicle is run without completing such an extent of warm-up of the engine 18 as required for conventional motor vehicles which are equipped with the thermal reactor 70.

It will be apparent that the temperature-sensitive switch 64 is not necessarily attached to the cooling water jacket 18a, but may alternatively be attached to a different part of the engine 18 for the detection of either an engine oil temperature or a temperature around the thermostat of an automatic choke.

Also it will be apparent that the present invention is concerned not only with the case of an upshift but also with the case of a downshift.

What is claimed is:

1. In a motor vehicle having an internal combustion engine, a thermal reactor for burning harmful substances in the exhaust gas before emission into the atmosphere and an automatic transmission of the type having a shifter valve for governing friction units, a governor valve for supplying a vehicle speed-sensitive governor pressure to the shifter valve, a throttle valve for supplying a throttle pressure responsive to vacuum developed in an intake manifold of the engine to the shifter valve and means to provide a regulated fluid pressure to the above three valves, the throttle valve having a flexible diaphragm, a face thereof being exposed to a chamber normally communicating with the intake manifold through a pipe, and means to modulate the regulated fluid pressure to a less magnitude of throttle pressure as the vacuum exerted on the diaphragm multiplies, an engine speed at which a shifting in the transmission occurs lowering as the vacuum multiplies, the improvement comprising a selector valve having a port communicating with the atmosphere and being mounted on said pipe such that said chamber normally communicates exclusively with said intake manifold, a temperature-sensitive switch attached to the engine and means to operate said selector valve at a position of said switch such that said chamber is caused to communicate exclusively with the atmosphere through said port, said switch being held at said position hereof when the temperature of the engine is below a predetermined temperature, thereby to raise the engine speed at which the shifting occurs and elevate the temperature of the exhaust gas.

2. The improvement according to claim 1, wherein said selector valve is a solenoid-operated three way selector valve.

3. The improvement according to claim 1, wherein said switch is attached to a cooling water jacket of the engine.

* * * * *